May 14, 1957  F. ZAPELLONI  2,792,457
HEARING AID EMBODIED IN SPECTACLES
Filed Jan. 23, 1953
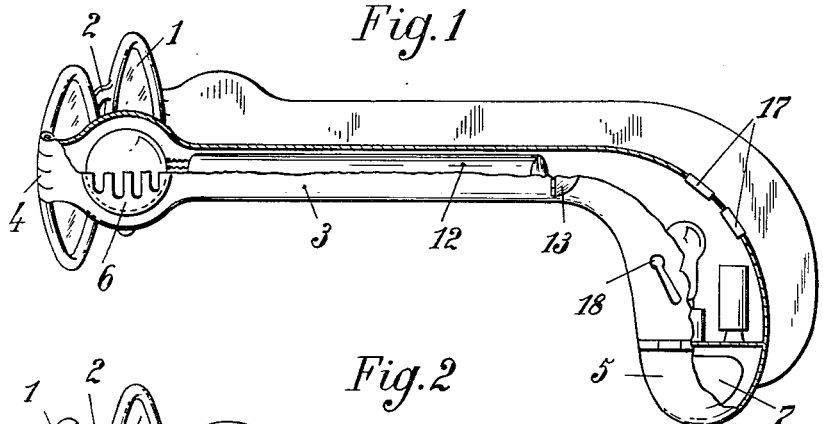
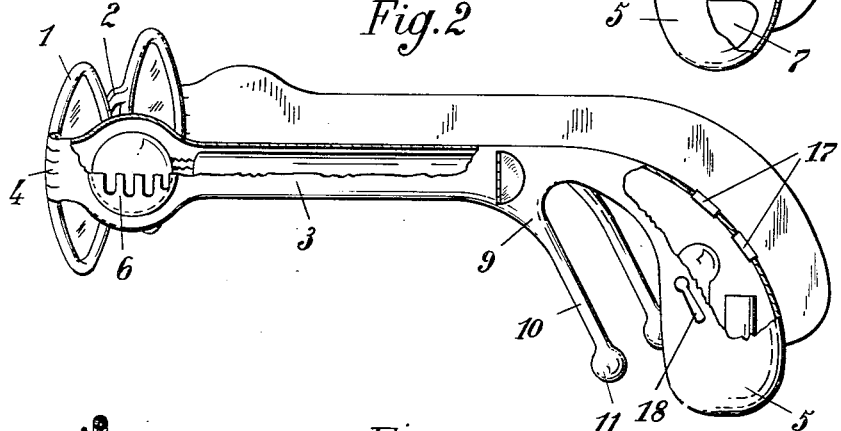
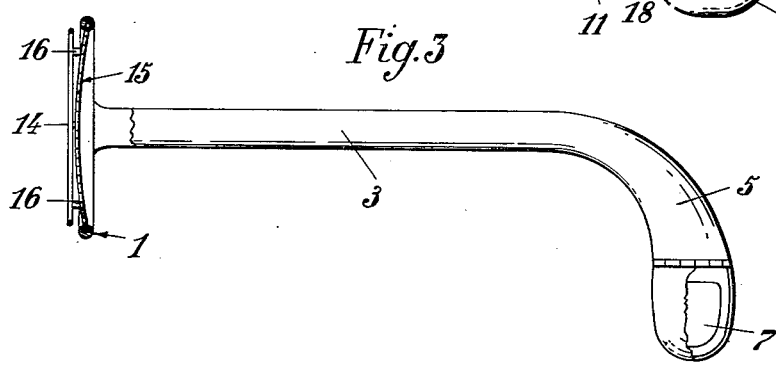
INVENTOR:
FEDERICO ZAPELLONI 2,792,457
Patented May 14, 1957

2,792,457
HEARING AID EMBODIED IN SPECTACLES

Federico Zapelloni, Rome, Italy

Application January 23, 1953, Serial No. 332,818

Claims priority, application Italy January 25, 1952

1 Claim. (Cl. 179—107)

The present invention relates to acoustical instruments of the type intended for helping hearing.

In general people with deficient vision freely wear spectacles in public, whereas the deaf or the hard of hearing are very sensitive about wearing hearing aids and prefer giving up the advantages that such instruments could afford to them.

It is an object of the present invention to provide a device of the type referred to, which is embodied in a special spectacle frame, which, besides carrying lenses or sunglasses, is also adapted to house all the adjustments of a hearing aid unit.

Such adjustments substantially are: a microphone, a battery for emission of electric current, a sound amplifier, a vibrator, besides means of regulation and of control therefore.

The fitting of said parts in a spectacle frame can be effected through different solutions, some of which are shown by way of non-limitative example in the annexed sheet of drawing to which reference will be made in the following description.

In the drawing:

Fig. 1 is a perspective view of spectacles made in accordance with the present invention housing in their frame a vibrator applied to the wearer's temporal bone;

Fig. 2 is the same vibrator inserted in the external auditory canal;

Fig. 3 is a different constructional form of the device in accordance with the invention, in which the microphone consists of transparent membranes arranged parallel to the glasses in the spectacles.

With reference particularly to Figs. 1 and 2 the device in accordance with the present invention comprises a frame for the eyeglasses, said frame comprising two lens mounts or rings 1—1, a nose bar 2 and two side bars 3 which are connected to said rings by means of hinges 4. At their rear part said bars end in an enlarged portion 5, while another enlarged zone is provided in said bars near the hinges 4, to house sound pickup means such as a microphone 6. A sound amplifier consisting of one or more thermionic tubes of least volume is disposed in the zone 5 of the bars, wherein also a vibrator 7 is housed; said vibrator acting to transform into acoustic vibrations the modulated currents coming from the microphone 6, and intensified by the above mentioned amplifier.

According to the construction shown in Fig. 1, when the spectacles in accordance with the present invention are in operation, the vibrator 7 rests directly against the wearer's temporal bone, thus transmitting sounds through said bone. To this end the hinges 4 can be provided with small springs which would tend to fold the bars and therefore urge said vibrator to press against to the wearer's head.

For the transmission of sounds by air, that is to say through the auditory canal, the spectacle side bars branch off (Fig. 2) before the curve which passes above the top of the ear. Such branches 9 are connected with a small tube 10, which turns around the ear lap to penetrate into the auditory canal, ending with a bulbous or portion 11.

Electric current for the operation of the device is supplied by dry cell batteries of small size, housed in the bars 3 into which they are inserted through a suitable passage 13.

A different construction of the device is shown in Fig. 3 where the receiver is constituted by thin transparent membranes 14 located in front and parallel to the median plane of the lenses 15. Such membranes will be hinged at a point of their perimeter, while free to vibrate on the remainder of said perimeter, being bound to a system of imperfect contacts 16 in such a way that their vibrations may be transformed into modulated electric impulses.

Said membranes will be fitted with suitable stop or damping means to hold them motionless when the hearing aid is inoperative; moreover they will be preferably removable to allow cleaning of the lenses.

The device described can be applied to one or to both sides of the spectacles. In this case it will be preferably constructed with independent parts in such a way that wires do not pass through the hinges 4 or through the front spectacle frame, though not preventing the two devices from being coupled in order to increase efficiency or from one serving as spare part with respect to the other.

The hearing aid described is completed by control and regulation means which can be of any known type. As appears from Figs. 1 to 2 said means can be constituted for instance by a switch 17 and a small knurled rotary disc 18 to regulate the sound intensity.

Variations can be made in the construction of the device in accordance with the present invention without falling out of the scope thereof. For instance the battery can be carried around in the pocket, that is to say it can be apart from the device, in which case conductors for the hearing can be contained in a cord resembling the spectacle string.

In case of slight deafness it can be sufficient to intensify vibrations and to convey them to the auditory canal without need for electronic amplification. In these cases the side bars of the spectacles will act as sounding boxes, being provided with a blade one end of which is fixed to the walls of said bars while the other end is free to quiver.

Having thus described the invention, what is claimed as new and desired to be secured by Letters Patent, is:

A hearing aid comprising a pair of frames for spectacles provided with a pair of connected lens mounts to be placed before the eyes of a wearer and further provided with a pair of hollowed side bars having forward and rearward ends, spring-urged hinge means connecting the forward ends of said side bars to said lens mounts, respectively, whereby said side bars are pressed with their rearward ends against the wearer's head, sound pick-up means carried by and placed adjacent said forward ends, means housed in the rearward ends of said side bars, respectively, for transmitting and amplifying sound received by said pick-up means, a pair of tubular branches connected to said side bars, respectively, and extending from the latter in downward direction and spaced from the rearward ends of said side bars and terminating in bulbous ends for contacting the auditory canals of the wearer whereby hearing is achieved through bone and sound conduction simultaneously, said sound pick-up means including a pair of microphones housed in said hollow side bars for position adjacent the temples of the wearer, and respective means on the rearward ends of said side bars for regulating the sound intensity and without affecting said tubular branches.

References Cited in the file of this patent

UNITED STATES PATENTS

| | | |
|---|---|---|
| 1,935,932 | Benway | Nov. 21, 1933 |
| 2,207,705 | Cox | July 16, 1940 |
| 2,613,282 | Scaife | Oct. 7, 1952 |

FOREIGN PATENTS

| | | |
|---|---|---|
| 541,226 | Great Britain | Nov. 18, 1941 |
| 990,602 | France | Sept. 24, 1951 |